C. F. STRNAD.
DRAFT ATTACHMENT FOR PLOWS.
APPLICATION FILED APR. 30, 1909.
936,829.
Patented Oct. 12, 1909.
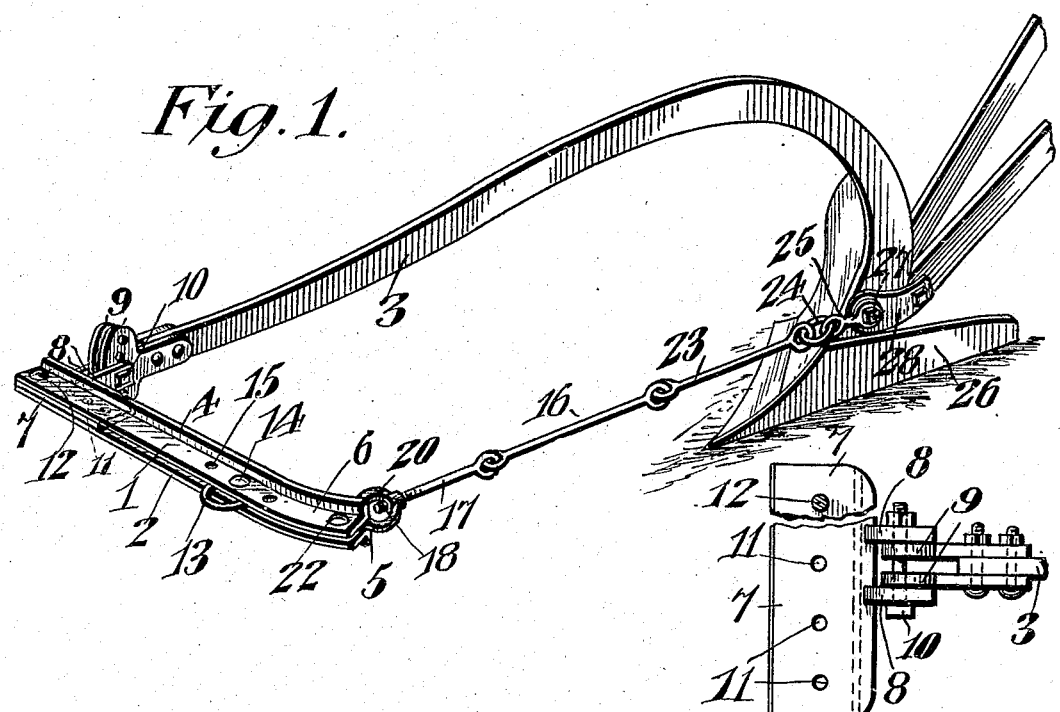
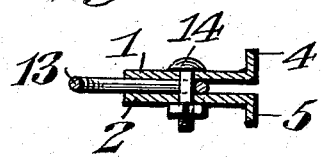
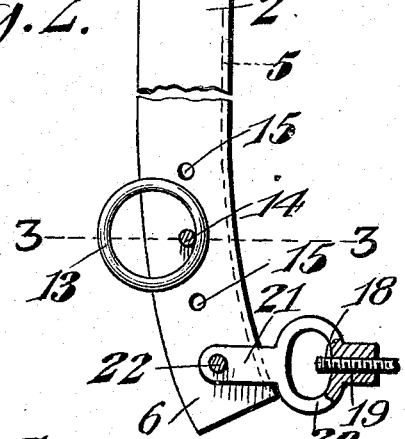
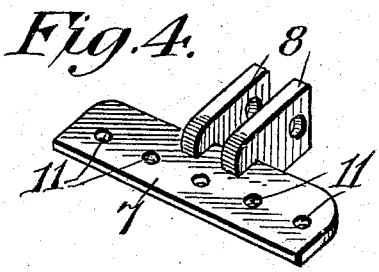
C. F. Strnad, Inventor
Witnesses

UNITED STATES PATENT OFFICE.

CHARLIE F. STRNAD, OF NARKA, KANSAS.

DRAFT ATTACHMENT FOR PLOWS.

936,829.  Specification of Letters Patent.  Patented Oct. 12, 1909.

Application filed April 30, 1909. Serial No. 493,148.

*To all whom it may concern:*

Be it known that I, CHARLIE F. STRNAD, a citizen of the United States, residing at Narka, in the county of Republic and State of Kansas, have invented a new and useful Draft Attachment for Plows, of which the following is a specification.

The invention relates to improvements in draft attachments for plows.

The object of the present invention is to improve the construction of draft attachments for plows, and to provide a simple, inexpensive and efficient draft attachment of great strength and durability, designed for use in connection with a four horse evener or equalizer, and capable of enabling such equalizer to operate properly in connection with a plow.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a draft attachment, constructed in accordance with this invention and shown applied to a plow. Fig. 2 is an enlarged horizontal sectional view of the front portion of the draft attachment. Fig. 3 is a detail sectional view, taken substantially on the line 3—3 of Fig. 2. Fig. 4 is a detail view of the link plate.

Like numerals of reference designate corresponding parts in all the figures of the drawing.

The draft attachment comprises in its construction a pair of transversely disposed bars or members 1 and 2, arranged one above the other in spaced relation and extending laterally from the front of a plow beam 3 and forming a transverse draft member. The transverse bars 1 and 2 have flat inner horizontal faces, and they are provided at their outer faces with longitudinal flanges 4 and 5, located at the rear edges of the draft bars and projecting upwardly from the upper bar and downwardly from the lower draft bar, as clearly illustrated in Fig. 3 of the drawing. The outer ends 6 of the draft bars are curved rearwardly to provide greater space in which an evener or equalizer (not shown) may operate.

The inner ends of the draft bars are spaced apart to receive a link plate 7, disposed horizontally and provided at its rear edge with vertical lugs or ears 8, located at the outer faces of and adjustably connected to a pair of vertical clevises 9, secured to the plow beam at the side faces thereof. The clevises 9 are provided at intervals with perforations and the ears or lugs of the link plate are pivoted to the clevises by a transverse bolt 10, which permits an oscillatory movement of the link plate. The link plate is provided at intervals with perforations 11, adjustably receiving a bolt 12, which also pierces the upper and lower draft bars. This adjustment of the inner ends of the draft bars coöperates with an intermediate adjustment of a clevis ring 13 to permit an equalizer or evener to be arranged properly to suit the width of the furrows. The clevis 13, which, in the embodiment of the invention illustrated in the accompanying drawing, is in the form of a ring, is secured between the upper and lower draft bars by means of a bolt 14, and the said draft bars are provided at intervals with perforations 15 to permit the adjustment of the bolt toward and from the plow beam.

The outer ends of the draft bars are adjustably connected with the plow by a flexible connection 16, extending rearwardly from the outer ends of the draft bars to a point adjacent to and above the landside of the plow. The flexible connection consists of a plurality of links or link rods, provided with terminal eyes linked into each other. The front link rod 17 has its front end 18 threaded and engaging a threaded opening 19 of a swivel eye 20. The swivel eye 20 has a shank 21, which is pivoted between the outer end of the draft bars by a bolt 22. The rear rod 23 of the flexible connection is connected by a ring 24 with a short link 25, which is secured to the plow beam at a point above the landside 26 by a bolt 27. The bolt 27 also pierces a clip 28 against which is fitted the short link 25, as clearly shown in Fig. 1 of the drawing. The threaded rod and the swivel eye permit an adjustment of the flexible connection, and the draft device is reversible to arrange it at either side of the plow beam. The attachment of the flexible connection to the plow at a point adjacent to and directly above the landside and at a point below the plane of the top of the mold board of the plow affords a light draft, and the employment of the double spaced draft bars arranges the clevis ring and the link plate centrally of the same, which eliminates twisting of the parts and permits a free pivotal movement of the link on the transverse pivot bolt 8. The clip plate by being arranged against the plow beam directly above the plane of the top of the mold board is located at one side of the space where all the trash is thrown by the soil turned over by the mold board, and the device equalizes or balances the draft on the plow, and affords increased space for the attachment of a rolling colter.

Having thus fully described my invention, what I claim as new and desire to secure by Letters Patent, is:—

1. The combination with a plow, of a draft attachment including a transversely disposed draft member connected at its inner end to the front end of the plow beam and extending laterally therefrom, a vertically disposed clip plate secured to the plow beam adjacent to and directly above the landside of the plow and at a point below the plane of the top of the mold board, a flexible connection extending rearwardly from the outer end of the draft member to the clip plate and secured to the same, and a clevis carried by the draft member.

2. A draft attachment for plows including spaced transverse draft bars, means for securing the inner ends of the draft bars to the front of a plow beam, a threaded swivel eye having a shank pivoted between the outer ends of the draft bars, a longitudinally disposed flexible connection provided at its front end with a threaded portion to engage the said eye and having means at its rear end for securing it to the rear portion of a plow, and a clevis carried by the draft bars.

3. A draft attachment for plows comprising a horizontal link plate provided with spaced lugs, a horizontal bolt piercing the lugs and adapted to connect the same with the front end of a plow beam, spaced transversely disposed draft bars receiving the link plate between them and connected with the same at the outer side thereof, a flexible connection secured between the outer ends of the draft bars and provided with means for connecting it with the rear portion of a plow, and a clevis carried by the draft bars and arranged between the same.

4. A draft attachment for plows including a link plate provided with means for pivoting it to a plow beam, spaced draft bars having flat inner faces and receiving the link plate between them and provided at their outer faces with longitudinal flanges, the outer ends of the said draft bars being curved rearwardly, a flexible connection secured between the outer ends of the draft bars and provided with means for connecting it to the rear portion of a plow, and a clevis also secured between the draft bars and extending in advance of the same.

In testimony, that I claim the foregoing as my own, I have hereto affixed my signature in the presence of two witnesses.

CHARLIE F. STRNAD.

Witnesses:
 F. J. KADAVY,
 CHARLES W. RUNDUS.